United States Patent [19]
Bonigen

[11] Patent Number: 6,084,203
[45] Date of Patent: Jul. 4, 2000

[54] METHOD AND DEVICE FOR WELDING WITH WELDING BEAM CONTROL

[75] Inventor: Christian Bonigen, Carrières sous Poissy, France

[73] Assignee: Axal, Louveciennes, France

[21] Appl. No.: 09/147,651

[22] PCT Filed: Aug. 6, 1997

[86] PCT No.: PCT/FR97/01459

§ 371 Date: Feb. 8, 1999

§ 102(e) Date: Feb. 8, 1999

[87] PCT Pub. No.: WO98/06533

PCT Pub. Date: Feb. 19, 1998

[30] Foreign Application Priority Data

Aug. 8, 1996 [FR] France ................... 96 10144

[51] Int. Cl.[7] ............... B23K 26/28; B23K 26/04
[52] U.S. Cl. ................ 219/121.63; 219/121.64; 219/121.83
[58] Field of Search ............ 219/121.83, 121.63, 219/121.64, 124.34

[56] References Cited

U.S. PATENT DOCUMENTS

| | | | |
|---|---|---|---|
| 4,380,696 | 4/1983 | Masaki | 219/124.34 |
| 4,429,211 | 1/1984 | Carstens et al. | 219/121.63 |
| 4,533,814 | 8/1985 | Ward | 219/121.63 |
| 5,001,324 | 3/1991 | Aiello et al. | 219/121.63 |
| 5,168,141 | 12/1992 | Tashjian et al. | 219/121.83 |
| 5,229,571 | 7/1993 | Neiheisel | 219/121.63 |
| 5,685,999 | 11/1997 | Wiedemann et al. | 219/121.83 |

FOREIGN PATENT DOCUMENTS

| | | |
|---|---|---|
| 0 522 811 | 1/1993 | European Pat. Off. . |
| 2 704 166 | 10/1994 | France . |
| 35 43 681 | 6/1987 | Germany . |
| 901203 | 7/1962 | United Kingdom . |
| 2318885 | 6/1998 | United Kingdom . |

*Primary Examiner*—Geoffrey S. Evans
*Attorney, Agent, or Firm*—Oblon, Spivak, McClelland, Maier & Neustadt, P.C.

[57] ABSTRACT

A method and a system for laser beam welding two pieces abutted along a joint, wherein a camera configured to observe the joint is mounted integral with a welding head thereby defining a camera/welding head assembly. The camera/welding head assembly is moved along the joint and orthogonal positions of the joint are detected for positions of the camera/welding head assembly along the joint. A guiding mechanism guides a welding laser beam impact along the joint by controlling an orthogonal translation of the camera/welding head assembly based on the orthogonal positions of the joint.

21 Claims, 5 Drawing Sheets

METHOD AND DEVICE FOR WELDING WITH WELDING BEAM CONTROL

BACKGROUND OF THE INVENTION

The present invention relates to a method and a device for welding two pieces, abutted in an assembling position, by means of a welding beam. While mainly developed for laser beam welding, this technology also may be appropriate for other spot welding processes, such as the plasma torch, TIG, MIG, MAG, or electron beam processes.

1. Field of the Invention

The invention particularly relates to the welding of tube lengths for realizing hydrocarbon transportation pipes, in particular on sea bottoms. This welding can take place in difficult conditions, such as is the case on a barge being subjected to movements induced by the sea, and to many vibrations generated by the equipment and motors located on board.

2. Description of the Related Art

For this purpose, a welding machine has already been conceived, comprising a fixed laser source which is spaced away from the tube lengths to be welded and the beam of which is guided, with the help of articulated optical path means, out to a laser head which bears a focussing device and is fixed on a support table rotating around the axis of the tube lengths, which are kept abutted by their ends. For the welding, the support table is rotated by means of the first electric motor around the tube lengths, while the laser head position is adjusted by an axial translation by means of a second electric motor. Such a device is described in the French Patent 93 04642 published under the reference number 2 704 166.

Laser welding requires an extremely precise positioning of the laser beam focussed onto the joint to be welded, namely +/−0.2 mm. The joint tracking control usually needs using a sensor fixed on the laser head, for detecting the eddy currents. This joint tracking system guides the laser head but not the laser beam itself. As a result, any misalignment of the optical path induces a deviation between the laser beam position and the joint to be welded, which may cause a defective welding since the laser beam kinematics cannot be simply deduced from the laser head kinematics. The eddy current sensor furthermore does not allow detecting the joint in an abutting assembly without clearance.

The object of the present invention is to realize a direct and precise piloting of the welding beam and of its impact by servo-controlling its position, where the welding plasma is formed, at the position of the joint to be welded.

For this purpose, the invention concerns a method for laser beam welding two pieces abutted in an assembling position along an assembly joint, to be welded by means of a welding head with a spot shaped beam, characterized in that at least during the welding phase a joint is continuously observed by means of a camera mounted integral with the welding head, by moving the welding head and camera assembly along the joint and by sensing the orthogonal position of the joint for each position of the welding head and camera assembly along the joint, in that the impact position of the welding beam is continuously observed, and in that a piloting of the configuration of an optical path for guiding said beam is insured by servo-controlling the impact position at the position of a joint detected by controlling a translation of the welding head and cameral assembly orthogonally to the joint.

The camera particularly may consist of either a standard camera, or more particularly a CCD camera or an infrared camera for the laser beam position finding operation.

A tracking of the welding plasma is thus performed by servo-controlling its position on the joint as a function of the detected joint position; in other words, the laser beam itself, and not just the laser head, is positioned in real time onto the joint to be welded. This allows reaching for the laser beam, and consequently for the created welding plasma, a positioning precision which is sufficient to insure a good weld, as opposed to the state of the art.

In an embodiment of the invention, during a learning phase, the welding head and camera assembly is moved along the entire assembly joint and a map of the orthogonal positions of the joint is established with respect to a linear marker arranged parallel to the joint line and, during a later welding phase, the welding is performed during a second movement of the welding head and camera assembly along the joint while servo-controlling the welding plasma position when the welding beam is being operated.

Advantageously, a linear optical marker extending along the assembly joint consequently is fixed onto one of the two pieces being maintained in the assembling position, in order to establish the map of the distance between this marker and the joint line for all operating positions of the welding head along the joint. Controlling the plasma position adjustment with respect to the marker is then all that is needed for insuring that the orthogonal distance between the joint and the marker, as supplied by the map, is respected. It should be noted that this servo-controlled piloting may be performed in real time, during the same welding head movement along the joint.

In particular, using the marker allows, during the learning phase and the welding phase, full insensitivity vis-à-vis the possible movements of the tube lengths with respect to the welding head and camera assembly. A rectilinear edge marker furthermore facilitates the position finding operation for the joint position tracking.

In the case where both pieces to be assembled are abutted tube lengths, the marker preferably consists of collar shaped band, the positioning of the welding head and camera assembly is obtained by an axial movement with respect to the tube lengths axis, and both map completion and welding are obtained by an orbital motion around the tube lengths. It is useful for such a collar to have an axial mark, i.e. along a generator of the pieces, which determines by reference an initial position of the welding head and camera assembly during the orbital motion.

In the case where both pieces to be welded are abutted, snugly fitted flat surfaces, it might be useful to chamfer the edge of one of the pieces. It then is easy to sense the joint position by observing its shadow under a lighting beam.

For the map completion, several movements of the welding head and camera assembly may be performed. A complete and precise map is thus obtained after several learning phases in cases where some points of the map are blurred or do not exist.

During the welding phase, an anti-dazzle screen and a filter are advantageously provided between the camera and the welding plasma. This allows obtaining a correct vision of the marker during this welding phase, and attenuating and filtering the plasma for more precisely sensing of the latter.

According to another characteristic of the invention, the optical observation beam of the camera is divided into two spatially spaced parts, which respectively are output towards the vicinity of the marker on the one hand and the joint or the welding plasma on the other hand. This allows using a low field objective, affording a good precision, even in cases where the marker and the joint to be welded or the plasma are separated by a large distance.

The invention also concerns a device for implementing the above defined method. Advantageously, the camera includes a CCD type sensor, located upstream of the laser head with respect to the movement along the assembly joint, so as to leave the desirable room for the laser head downstream. It further is advantageous for the welding head to include a focussing device with a beam reflection mirror rotatably mounted around its optical axis.

In cases where the invention is applied to a device designed for welding abutted tube lengths and including a fixed laser source spaced away from the tube lengths to be welded, the welding beam advantageously is guided by means of an articulated optical path out to a laser head including a focussing device fixed on a support table rotating around the axis of the tube lengths maintained in abutment at their ends. Such an optical path preferably includes, starting from the laser source, a first part the means of which are floatingly mounted with all degrees of freedom on a fixed support table, and a following second part leading the beam out to the focussing device which is fixed on a rotating support table, rotatable around the tube lengths with respect to the fixed support table.

Such an arrangement allows obtaining a "soft" optical path between the laser source and the focussing device. The relative motions between the fixed support table and the tube lengths to be welded (in a case where the fixed support table is integrally assembled with the tube lengths) are entirely governed by the first floating part of the optical path, and the tracking of the marker or the joint is performed on the second part of the optical path without any need for taking into account the relative motions of the various elements of the welding device. As previously indicated, these movements indeed are quite numerous when a welding is performed aboard a barge.

This floating mounting may notably be realized by means of a ball bearing located on the fixed support table and supporting a freely translatable device in the direction perpendicular to the fixed support table. It also is possible to use a sliding linking, based for instance on polytetrafluoroethylene shoes or an air cushion device, or else a movement support table along x-y coordinates with rotation.

Advantageously, the first part of the optical path includes an arm mounted in a freely articulated manner with respect to an axis parallel to the fixed support table, so as to obtain a variable slanting of said arm with respect to the fixed support table. This first part of the optical path may include an arm both ends of which are rotatably mounted with respect to one another around the axis of the arm, which allows obtaining one of the degrees of freedom, here in rotation.

BRIEF DESCRIPTION OF THE DRAWINGS

The invention will now be more completely described within the frame of its preferred characteristics and their advantages, while referring to the figures of the appended drawing wherein.

DESCRIPTION OF THE PREFERRED EMBODIMENTS

Figure 4:
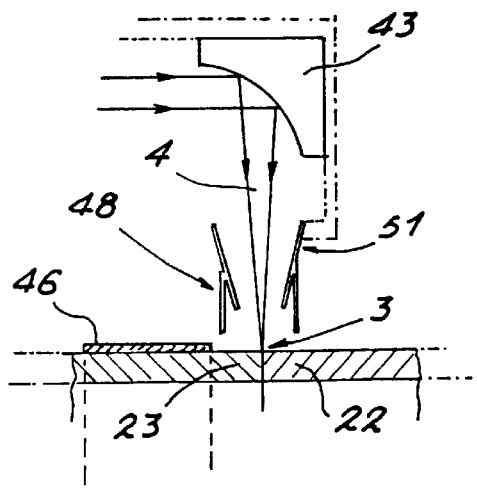
FIGS. 4 and 5 respectively represent an axial view and a radial view of the location of the welding head and that of the camera in the direction of the joint to be welded.

The invention relates to beam welding with a spot shaped impact, more particularly to laser beam welding, between two pieces 22 and 23 which are kept abutted, as notably illustrated in FIG. 4, in an assembling position where they are abutted along a joint 3 to be welded. The laser beam 4 is driven along the joint 3. It is focussed on this joint by means of a focussing head 43. The focussing should correctly align the laser beam 4 onto the joint 3 since the welding otherwise would be unacceptable. It is considered here that obtaining a correct welding requires the positioning to be insured with a tolerance of +or −0.2 mm, which, in the case of a beam misalignment being ascertained, would not be possible if only the focussing head position is controlled.

The invention consequently proposes realizing a real time servo-controlling of the impact spot of the welding beam 4 as a function of the exact joint position, perpendicularly to the joint line on which the beam runs during the welding operation.

For this purpose, referring to the implementation illustrated in FIGS. 1 to 3, the joint is continuously observed for detecting its position by means of a camera integrally assembled with the welding head, the map of the joint position for each position of the welding head and camera assembly along the joint is established during a learning phase and, simultaneously or later, the welding beam impact is continuously observed and its position is servo-controlled by controlling a translation of the welding head and camera assembly orthogonally to the joint, i.e. perpendicularly to the welding head movement along the joint line, as a function of the joint position sensed during said mapping.

This can be accomplished in just one movement, with the joint being observed at a fixed distance ahead of the welding plasma, and with the joint position being determined by the position of the servo-control motor and the position of the joint image on a screen which displays the information supplied by the camera. The welding plasma image position on the screen is servo-controlled as a function of the joint position supplied by the map, while taking into account the distance between the joint observation point and the impact spot where the welding plasma is being formed.

It also is possible to operate in two distinct phases, which implies two successive movement operations along the joint to be welded. During the first movement corresponding to the learning phase, the map of the joint position is established, and during the second movement, in the welding phase, the welding head is piloted by adjusting the welding beam position by servo-controlling with respect to the joint, based on of this map. The learning phase may possibly be repeated to obtain a more precise map, without any gap.

In this embodiment, it is advantageous to use an optic marker 6 (see FIG. 3), shaped as a linear band, which is fixed on one of the two pieces 22 or 23 along the joint 3. In this case, the map consists of the continuously measured distance between the joint 3 and the marker 6, and the position of the head 43 is servo-controlled such that the distance between the welding plasma and the marker 6 is a duplication of the distance to the joint for each position along the joint path, during the head movement in the welding phase.

Figure 2:
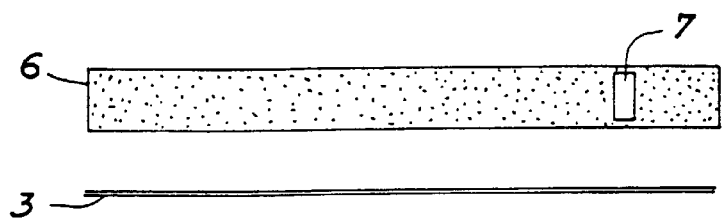
FIG. 2 illustrates the constitution of a marker.

The marker 6 as illustrated in FIG. 2 includes a cross mark 7, which allows marking an initial position for the movements to be performed along the joint. The longitudinal position can also be marked at each instant with the help of an encoder sensitive to, either the angular gaps during the welding head rotation when abutted tubes are being welded, or to the head movement in a plane for other applications, such as when welding abutted flat sheets.

Figure 1:
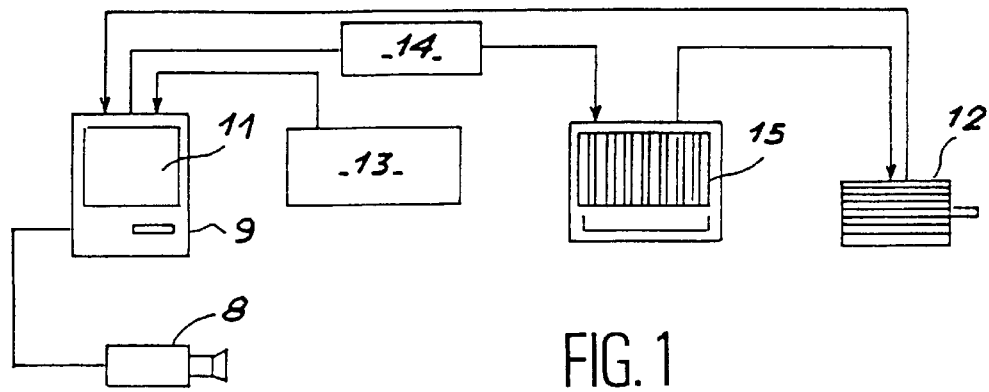
FIG. 1 schematically represents the essential elements of a particular installation for implementing the invention.

FIG. 1 schematically illustrates an installation for implementing the invention method. It includes a digital camera 8, for instance a CCD camera, which simultaneously observes the marker 6 and the joint 3 or the welding plasma. A computer 9, preferably with a visualizing screen 11, receives and processes the data for the camera 8 as well as position data being received from the motor 12 for the servo-control of orthogonal position and the motor 13 for movement along the joint. Based on these data, the computer establishes the joint position map with respect to the marker and elaborates and outputs movement commands to the variator 15 controlling the servo-control motor 12, which commands realize the adjustment of the servo-controlled orthogonal position, by means of an input/output board 14.

The marker advantageously is located within a small distance from the joint, for instance 20 mm, so as to obtain appropriately dimensioned images of the joint, the marker and the plasma. In the case where locating such a marker within a small distance is not possible, the camera observation beam may be divided into two beams, for instance by means of prisms or mirrors, which allow distinguishing by means of well known technologies between the information relating to the marker on the one hand, and the information relating to the welding beam position and the position of the joint itself on the other hand.

Figure 5:
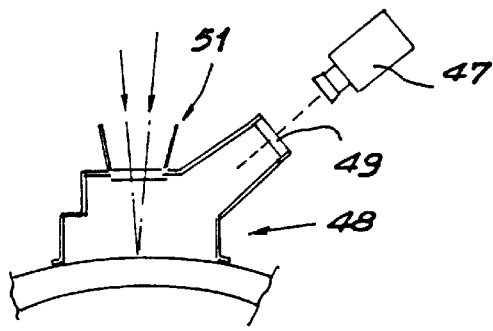

FIG. 5 is a complement to FIG. 4 for showing the camera 47, referenced as 8 on FIG. 1. This camera is fixedly mounted on the same frame as the focussing head 43 shown on the Figures. An anti-dazzle screen 48 is located in the sighting beam of the camera, in front of the plasma created in the vicinity of the joint 3 between both pieces 22 and 23 during the welding phase, so as to clearly distinguish a marker illustrated as 46 which normally is not bright. A removable filter 49, which allows refining the observed plasma image also can be located. A nozzle 51 is interposed in a traditional manner on the path of the focused laser beam, at the entrance of an enclosure for visual confinement limited by the screen 48.

The FIGS. 6 to 9 represent an installation which applies the method and the device of the invention within the operating frame of welding abutted tube lengths on a barge, notably for realizing and installing hydrocarbon transportation pipe-lines.

The device of the invention includes a fixed support 21, which supports a fixed laser source 27, which is spaced away from the tube lengths to be welded 22 and 23. The laser welding beam output from this source is guided by an articulated optical path towards the welding head 43 which is fixed on a support table 24 rotatably mounted on the support table 21. The rotating support table 24 is located coaxially with respect to both tube lengths 22 and 23 and is rotatably driven around their axis 25 by a motor 26.

Both tube lengths which are the pieces to be welded re maintained in the assembling position by any appropriate means, generally either by claws or external catching collars, or by catching systems with inflatable pads or with suction cups introduced from the inside. They are abutted in their assembling positions by their respective end faces.

The means defining the optical path can be divided into a first path, starting from the laser source 27 and constituting a floating mount with all degrees of freedom with respect to the fixed support table 21, and a second part, following the latter to guide the beam out to the focussing head 43 mounted on the rotating support table 24.

The first part of the optical path includes an arm 28, with a fixed length, consisting of two tubular elements sliding with respect to one another. At the end of this arm which is facing away from the source 27, a reflection mirror 29 is rotatably mounted around the vertical axis of a bent part 32, at the end of which an other reflection mirror 33 turning on a horizontal axis is located. The beam is thus reflected into a vertical direction, i.e. perpendicularly to the fixed support table 21. The rotation of the mirror 29 allows slanting the arm 28 with respect to the fixed support table 21.

The assembly, consisting of the arms 28 and 32 and the mirrors 29 and 33, is mounted in a freely translatable manner in the vertical direction by sliding along a vertical rail integral with a vertical frame 35. At the upper end of the latter, a reflection mirror 30 directs the beam towards the second part of the optical path.

This mirror 30 is rotatably mounted around a vertical axis to insure a rotation of the second part of the optical path with respect to the first part, parallel to the support table 21.

The vertical frame 35 is mounted on the support table 21 with a possibility of free translation in both directions in the plane of the support table 21 and free rotation around a vertical axis. This can be achieved by means of a ball bearing 36 rolling on a ball carpet located on the support table 21. Air cushions or shoes of low sliding polytetrafluoroethylene also can be used. The same effects also alternatively can be obtained by means of a x-y movement table with a rotation system.

The second part of the optical path includes a telescopic arm 37 which receives the beam reflected from the mirror 30 and insures a translation movement along its axis. It includes at its end a couple of reflection mirrors 38 and 39 which serve to admit the beam into an arm 41, of a fixed length.

The arm 41 has at its other end a reflection mirror 42, rotatably mounted on a frame 45 for directing the beam onto the focussing device 43. The latter is supported by a secondary frame 44 (FIG. 9) which is movably mounted in vertical translation, under the control of the servo-control motor with respect to the frame 45 which is fixed on the rotating support table 24. It might further be useful to rotatably mount the focussing head 43 onto the frame 44, for rotation around the vertical axis of the rotating mirror 42, so as to adjust at will the beam slanting angle in the plane of the joint 3.

Figure 9:
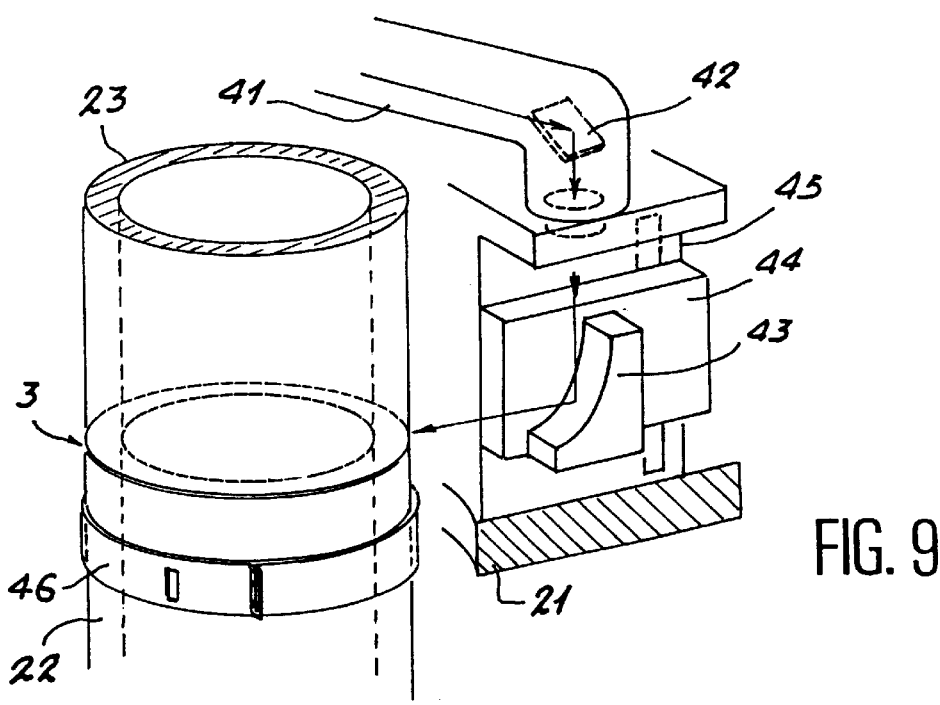
FIG. 9 is a view of a detail of FIG. 6.
Figure 6:
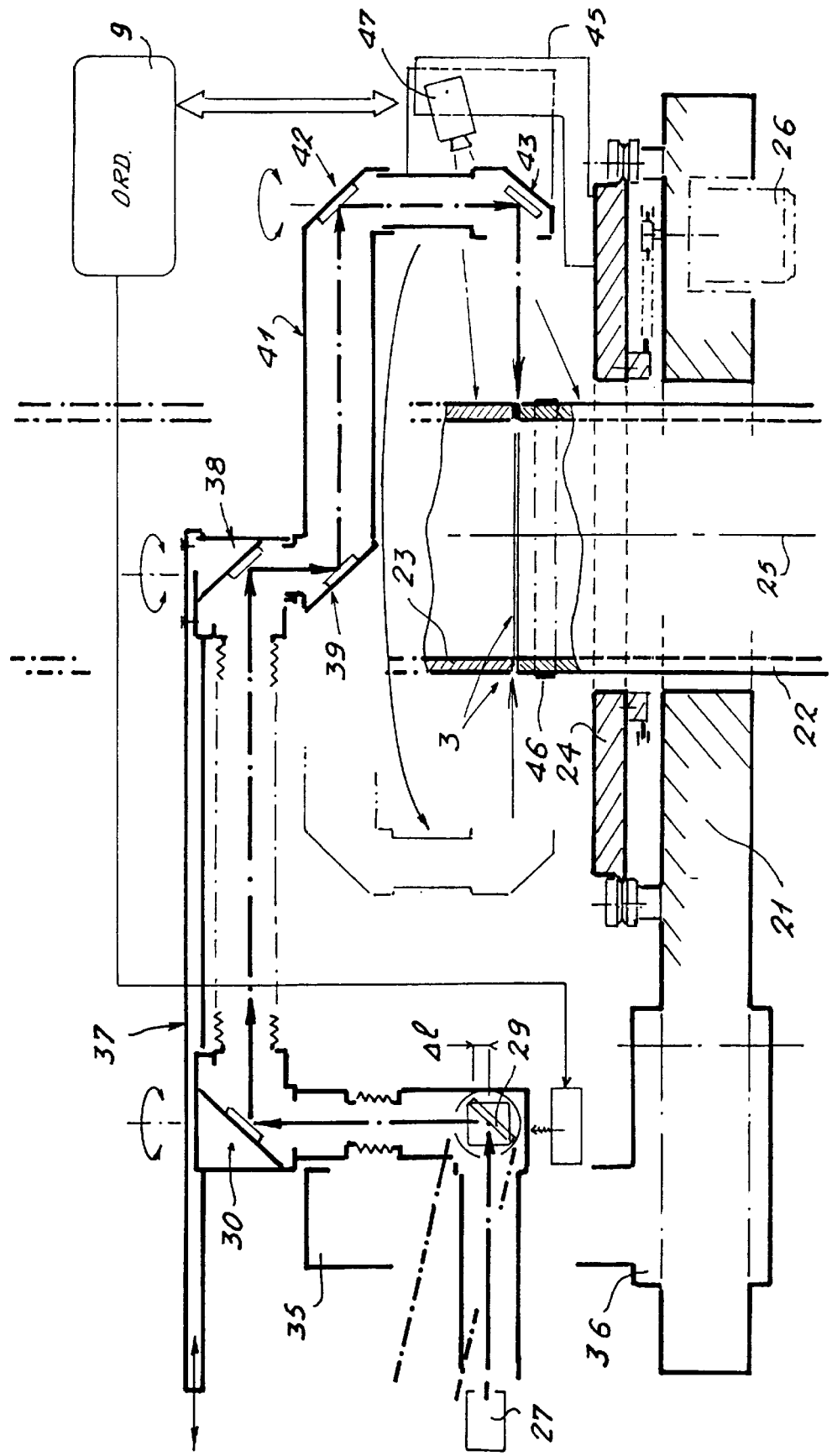
FIG. 6 is a schematic side view of a welding device of the invention, notably illustrating the constitutive means of the optical path of the laser beam out to the welding plasma, in a preferred application for welding tube lengths kept in abutment.
Figure 7:
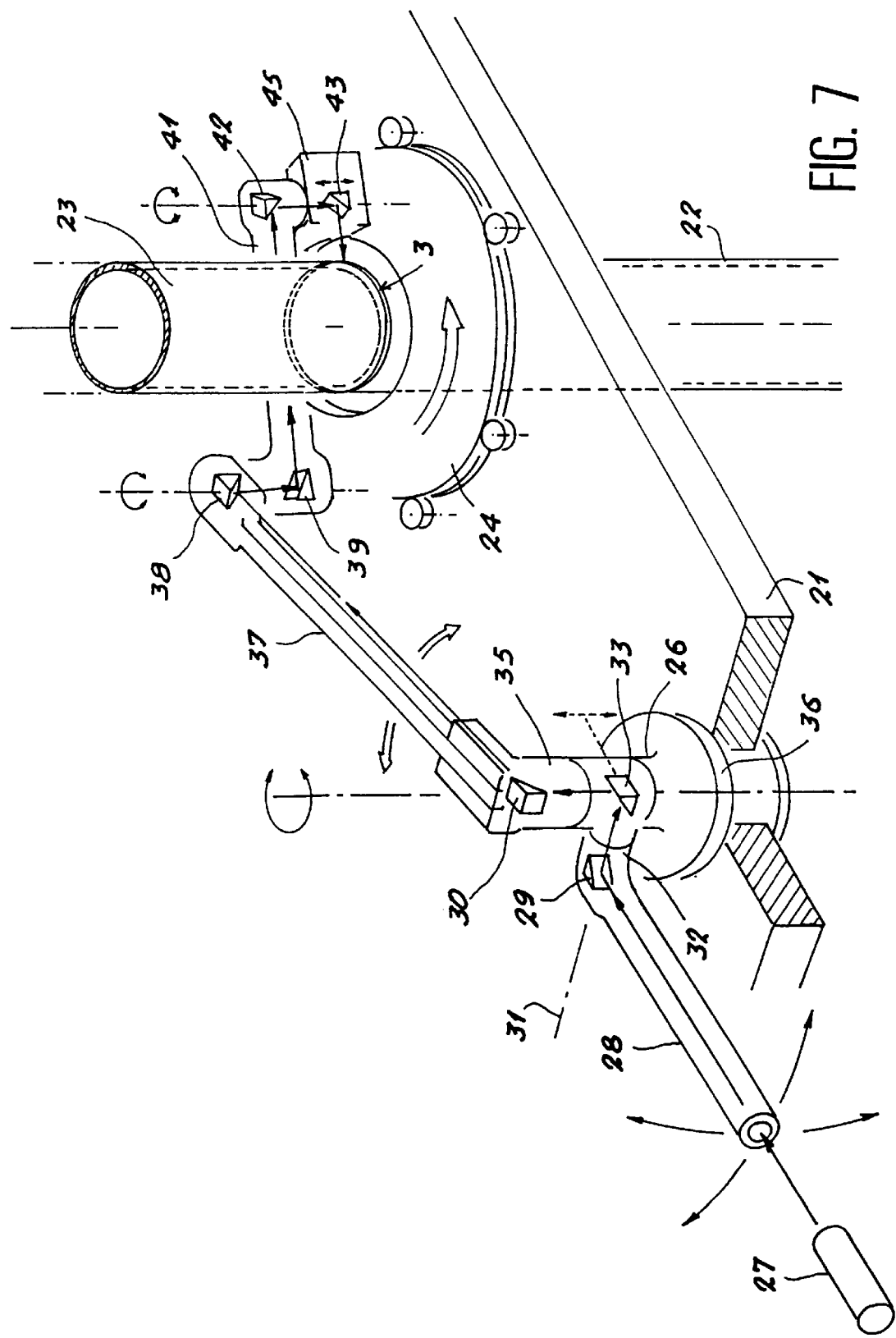
FIG. 7 is a perspective view of the welding device of FIG. 6.
Figure 8:
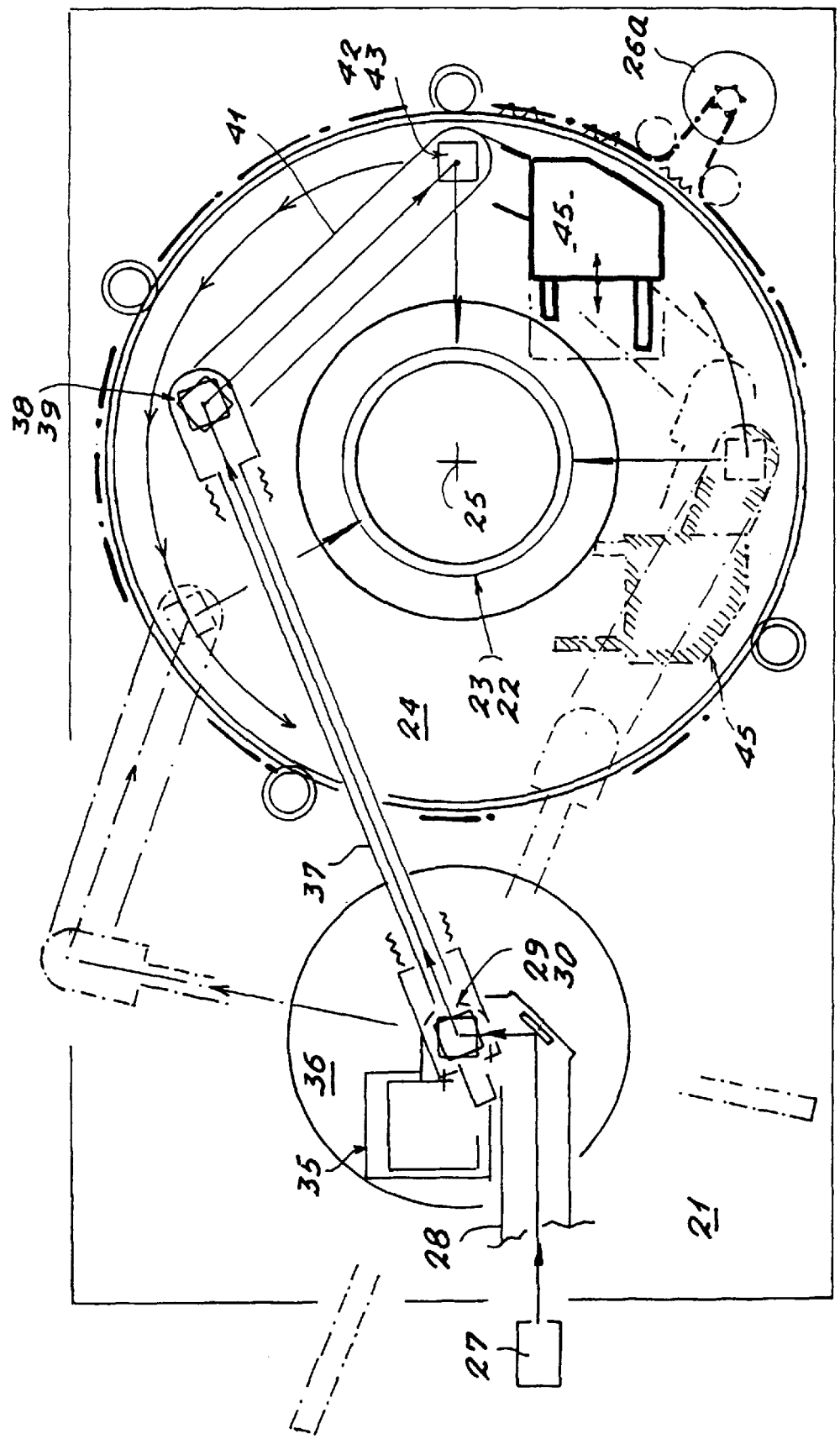
FIG. 8 is a top view of the device of FIG. 6.

The application, as particularly illustrated by the FIGS. 6 and 9, implies a continuous marker for lateral positioning, which consists of a collar 46 born by the tube length 22, and the camera 47 is mounted on the frame 45.

Figure 3:
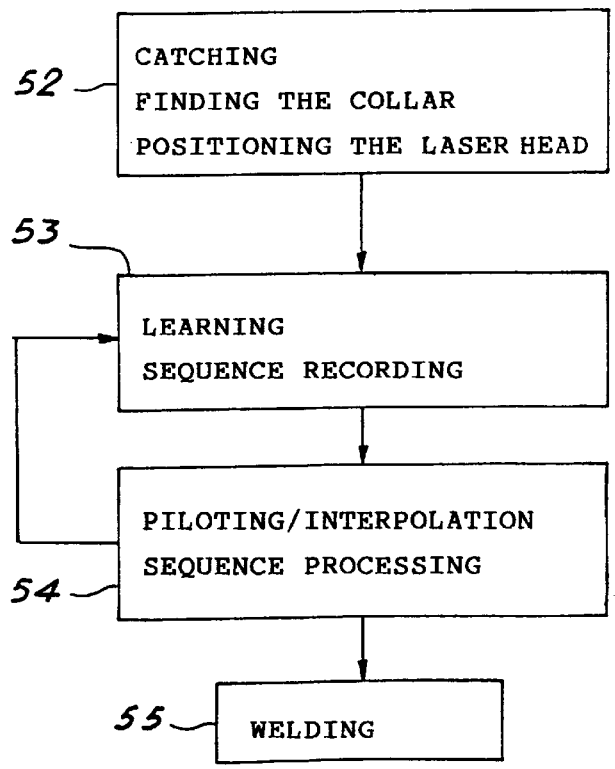
FIG. 3 is a flow chart of a particular embodiment of the method of the invention in the case where such implies a learning phase.

The method is summarized in the flow chart of FIG. 3. In a first step 52, the laser head is positioned rewards of the mark 7 (FIG. 2) by means of the driving motor 26 of the support table 24. The servo-control motor is then controlled for searching for the collar 46 in the camera field. When the collar has been found, it is framed so as to perceive the joint 3.

In a second step 53, the learning phase is launched by triggering an orbital path of the support table 24 around the tube lengths 22 and 23. As soon as the camera detects the mark 7, the distance between the collar and the joint is continuously recorded as a function of the angular support table position and, when the mark 7 is detected again, the motor 26 is stopped and the process enters the piloting mode. During that phase, a tracking of the collar is operated, which is well regular, which limits the movements managed by the servo-control motor.

In a third step 54, the computer processes information acquired by evaluating the missing (joint not found) or doubtful data and the optimal analytical adjustment of the distance between the joint and the collar is performed by interpolation. In some cases, a new learning phase may be commanded to refine the map.

In the last step 55, the welding is realized. The laser head is positioned rearwards of the mark 7 and the orbital motion is triggered. As soon as the mark has been found, the servo-control system is commuted to the welding beam piloting mode to insure that the welding plasma will permanently be repositioned, perpendicular to the assembly joint, to be welded all along the orbital motion. The screens are placed in front of the camera and the laser firing is commanded. The servo-control continuously corrects the distance between the joint and the collar with respect with registered values supplied by the learning map.

A second welding phase can be effected with filler metal. The method of the invention also is adapted to furthermore perform a weld quality control by analyzing the plasma defects, for example by examining its shape or by sensing its possible extension.

The invention is in no way limited to the above described embodiment and many alterations or variations are possible. It in particular can be applied to any spot beam welding operations requiring a high welding beam positioning precision onto the joint to be welded, whereas it however is easily adaptable to piloting a beam performing a weld between two flat sheets maintained in their abutted assembling positions along a rectilinear average joint line.

Furthermore, the camera can be conceived for distributing the visual position detection observation into two different optical paths, or this device may include two different apparatuses for respectively observing the joint and the welding plasma. The viewing field of the camera 47 can in particular be divided by means of prisms or mirrors. On the other hand, one might prefer using an infrared camera to observe the welding plasma, with the plasma position being determined by the epicenter of the obtained image.

What is claimed is:

1. A method for laser beam welding two pieces abutted along a joint, comprising the steps of:
    observing said joint with a camera, said camera being integral with a welding head thereby defining a camera/welding head assembly;
    moving said camera/welding head assembly along said joint;
    detecting orthogonal positions of said joint for positions of said camera/welding head assembly along the joint;
    observing a welding laser beam impact; and
    guiding said welding laser beam impact by controlling an orthogonal translation of the camera/welding head assembly based on said orthogonal positions of said joint.

2. A method according to claim 1, wherein the steps are performed simultaneously.

3. A method according to claim 1, further comprising:
    establishing a map of orthogonal positions of the joint during a learning phase, and
    referring to said map during guiding the welding laser beam impact.

4. A method according to claim 3, wherein establishing said map comprises establishing distances between said joint and a marker extending along said joint and fixed on one of said two pieces.

5. A method according to claim 4, wherein said two pieces are tube lengths, said marker is a collar around one of said tube lengths, and said moving step comprises orbiting said camera/welding head assembly around said tube lengths.

6. A method according to claim 5, further comprising determining an initial position of said camera/welding head assembly by detecting a mark on said collar.

7. A method according to claim 4, further comprising observing said joint and said marker with two spatially separated parts of an optical observation beam of said camera.

8. A method according to claim 7, further comprising placing an anti-dazzle screen between the camera and the impact of the welding laser beam.

9. A system for laser beam welding two pieces abutted along a joint, comprising:
    a welding head;
    a camera integral with said welding head thereby defining a camera/welding head assembly and configured to observe the joint;
    a movement mechanism configured to move said camera/welding head assembly along said joint;
    a detection mechanism configured to detect orthogonal positions of said joint for positions of said camera/welding head assembly along the joint; and
    a guiding mechanism configured to guide a welding laser beam impact along said joint,
    wherein said guiding mechanism comprises a control mechanism configured to control an orthogonal translation of the camera/welding head assembly based on said orthogonal positions of said joint.

10. A system according to claim 9, wherein the camera is located upstream from the welding head with respect to a path of the camera/welding head assembly.

11. A system according to claim 9, wherein the camera comprises at least one of a CCD sensor and an infrared camera.

12. A system according to claim 9, wherein the welding head comprises a focusing device including a rotatable reflecting mirror.

13. A system according to claim 9, wherein said control mechanism comprises a map of orthogonal positions of said joint.

14. A system according to claim 13, wherein:
    said detection mechanism comprises a marker fixed along said joint, and
    said map comprises distances between said joint and said marker.

15. A system according to claim 14, wherein said camera comprises an optical observation beam with two spatially separated parts, one part being configured to observe the joint and the other part being configured to observe the marker.

16. A system according to claim 15, further comprising an anti-dazzle screen between the camera and the welding laser beam impact.

17. A system according to claim 14, wherein:

said two pieces are tube lengths, said marker is a collar fixed around one of said tube lengths, and said movement mechanism is configured to orbit around said tube lengths.

18. A system according to claim 17, wherein said collar has a mark indicating an initial position for the camera/welding head assembly.

19. A system according to claim 17, further comprising:

a fixed laser source spaced away from the tube lengths; and an articulated optical path configured to guide a laser beam from said laser source to said welding head, wherein said movement mechanism comprises a rotatable support table rotatably mounted on a fixed support table and configured to support said welding head and to rotate around said tube lengths.

20. A system according to claim 19, wherein said articulated optical path comprises:

a first movable device configured to move a first part of the articulated optical path in a plane parallel to said fixed support table;

a second movable device configured to move said first part of the articulated optical path in a direction perpendicular to said plane; and a second part of the articulated optical path configured to guide the laser beam from the first part to the welding head.

21. A system according to claim 20, wherein said first part of the articulated optical path comprises an arm mounted in a freely articulated manner with respect to an axis parallel to the fixed support table, whereby said arm has a variable slanting with respect to the fixed support table, said arm having two ends rotatably mounted with respect to each other around the axis of the arm.

* * * * *